(12) United States Patent
Sejalon et al.

(10) Patent No.: US 10,618,471 B2
(45) Date of Patent: Apr. 14, 2020

(54) VIRTUAL CAMERA PANNING AND TILTING

(71) Applicant: Robert Bosch GmbH, Stuttgart (DE)

(72) Inventors: Frederic M. Sejalon, Commerce Township, MI (US); Matthew Baran, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 15/827,557

(22) Filed: Nov. 30, 2017

(65) Prior Publication Data
US 2019/0161015 A1 May 30, 2019

(51) Int. Cl.
| | |
|---|---|
| *H04N 7/18* | (2006.01) |
| *B60R 1/12* | (2006.01) |
| *G02B 27/00* | (2006.01) |
| *B60R 1/02* | (2006.01) |
| *B60R 1/00* | (2006.01) |
| *B60R 1/08* | (2006.01) |
| *H04N 5/232* | (2006.01) |

(52) U.S. Cl.
CPC .......... *B60R 1/12* (2013.01); *B60R 1/00* (2013.01); *B60R 1/006* (2013.01); *B60R 1/025* (2013.01); *B60R 1/081* (2013.01); *G02B 27/0025* (2013.01); *H04N 5/23238* (2013.01); *H04N 5/23299* (2018.08); *H04N 7/18* (2013.01); *H04N 7/183* (2013.01); *B60R 2001/1253* (2013.01); *B60R 2300/101* (2013.01); *B60R 2300/406* (2013.01); *B60R 2300/605* (2013.01)

(58) Field of Classification Search
CPC ......... G06T 3/0018; G06T 2207/30252; G06T 2207/10024; G06T 5/006; G06T 2207/20092
USPC ........................................................ 348/148
See application file for complete search history.

(56) References Cited

U.S. PATENT DOCUMENTS

| | | | |
|---|---|---|---|
| 8,368,687 B2 | 2/2013 | Iwano | |
| 2005/0030380 A1 | 2/2005 | Oizumi | |
| 2008/0129723 A1* | 6/2008 | Comer | ................ G06T 3/0018 345/419 |
| 2010/0208032 A1 | 8/2010 | Kweon | |
| 2010/0231717 A1 | 9/2010 | Sasaki et al. | |
| 2014/0104424 A1 | 4/2014 | Zhang et al. | |
| 2014/0114534 A1 | 4/2014 | Zhang et al. | |
| 2015/0062292 A1 | 3/2015 | Kweon | |
| 2015/0085120 A1 | 3/2015 | Heinemann | |

(Continued)

*Primary Examiner* — Masum Billah
(74) *Attorney, Agent, or Firm* — Michael Best & Friedrich LLP

(57) ABSTRACT

A camera system comprising a first video camera having a first field of vision, an orientation adjustment switch, a first display, and an electronic processor. The electronic processor is configured to receive, from the first video camera, a non-rectilinear image of the first field of vision and receive, from the orientation adjustment switch, input defining an axis of a second field of vision within the first field of vision. The electronic processor is also configured to apply a distortion correction method to the non-rectilinear image of the first field of vision to produce a rectilinear image of the first field of vision. The electronic processor is further configured to determine a rectilinear image of the second field of vision within the rectilinear image of the first field of vision, and display the rectilinear image of the second field of vision on the first display.

17 Claims, 7 Drawing Sheets

400

(56) References Cited

U.S. PATENT DOCUMENTS

| | | | |
|---|---|---|---|
| 2015/0178884 A1* | 6/2015 | Scholl | G06T 3/0018 348/36 |
| 2017/0015248 A1 | 1/2017 | Baur | |
| 2017/0024851 A1 | 1/2017 | Baran | |
| 2017/0026572 A1* | 1/2017 | Baran | H04N 5/23238 |

* cited by examiner

400

VIRTUAL CAMERA PANNING AND TILTING

FIELD

Embodiments relate to automotive control systems.

BACKGROUND

Vehicles are often equipped with mirrors that allow a driver to easily check the surrounding environment of the vehicle. The mirrors are adjusted by the driver until the mirrors are oriented in a way that allows the driver to see as much of the vehicle's surrounding environment as possible. In modern vehicles, mirrors may sometimes be replaced with video cameras to improve the aerodynamic properties of the vehicle, thereby reducing fuel consumption.

SUMMARY

One embodiment provides a camera system comprising a first video camera having a first field of vision, an orientation adjustment switch, a first display, and an electronic processor. The electronic processor is configured to receive, from the first video camera, a non-rectilinear image of the first field of vision and to receive, from the orientation adjustment switch, input defining an axis of a second field of vision within the first field of vision. The electronic processor is also configured to apply a distortion correction method to the non-rectilinear image of the first field of vision to produce a rectilinear image of the first field of vision. The electronic processor is further configured to determine a rectilinear image of the second field of vision within the rectilinear image of the first field of vision, and display the rectilinear image of the second field of vision on the first display.

Another embodiment provides a method for displaying a virtual field of vision within a field of vision received from a video camera using a camera system. The method includes receiving, from a first video camera, a non-rectilinear image of a first field of vision and receiving, from an orientation adjustment switch, input defining an axis of a second field of vision within the first field of vision. The method also includes determining, with an electronic processor, a non-rectilinear image of the second field of vision within the non-rectilinear image of the first field of vision. The method further includes applying, with the electronic processor, a distortion correction method to the non-rectilinear image of the second field of vision to produce a rectilinear image of the second field of vision and displaying the rectilinear image of the second field of vision via a first display.

DETAILED DESCRIPTION

As noted above, vehicle mirrors are sometimes replaced with video cameras. Video feed from the video cameras is displayed on a display that the driver can easily see. The orientations of the video cameras are adjusted (for example, they are panned and tilted) by the driver until the video cameras are oriented in a way that allows the driver to see as much of the vehicle's surrounding environment as possible. The embodiments described herein relate to a system and a method for adjusting the perspective of the video feed displayed by the display without changing the position or orientation of the video camera. In some instances, the perspective of the video feed is adjusted by moving a second field of vision within a larger first field of vision of a stationary video camera. In some embodiments presented below, the image of the vehicle's surrounding environment that is captured in the first field of vision is analogous to the area of the vehicle's surrounding environment that a mobile video camera is able to capture by adjusting its position (for example, by panning, tilting, or both). The second field of vision is analogous to the area of the vehicle's surrounding environment that the mobile video camera can capture in an adjusted position. Therefore, the image of the second field of vision is an analog or virtual counterpart of the image captured by the mobile video camera in the adjusted position.

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
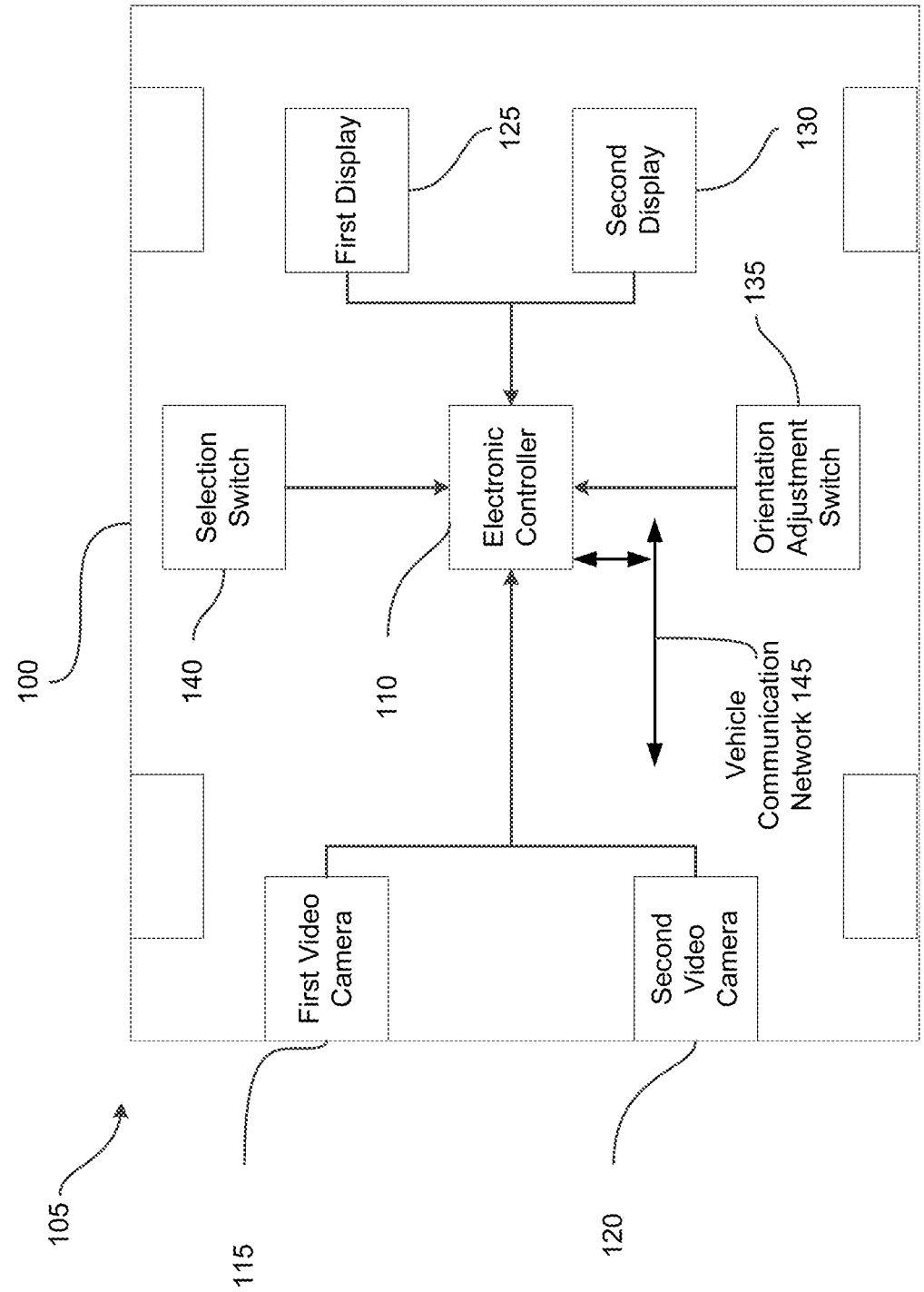
FIG. 1 is a block diagram of a vehicle equipped with a camera system.

FIG. 1 illustrates a vehicle 100 equipped with a camera system 105. The vehicle 100, although illustrated as a four-wheeled vehicle, may encompass various types and designs of vehicles. For example, the vehicle 100 may be an automobile, a motorcycle, a truck, a bus, a semi-tractor, or another type of vehicle. The vehicle 100 may have some autonomous functionality, but may also require a driver or operator to perform driving functions. In the example illustrated, the camera system 105 includes several hardware components including an electronic controller 110, a first video camera 115, a second video camera 120, a first display 125, a second display 130, an orientation adjustment switch 135, and a selection switch 140. The components of the camera system 105 may be of various constructions and may use various communication types and protocols.

The electronic controller 110 may be communicatively connected to the first video camera 115, second video camera 120, first display 125, second display 130, orientation adjustment switch 135, and selection switch 140 via various wired or wireless connections. For example, in some embodiments, the electronic controller 110 is directly coupled via a dedicated wire to each of the above-listed components of the camera system 105. In other embodiments, the electronic controller 110 is communicatively coupled to one or more of the components via a shared communication link such as a vehicle communication network or bus 145 (for example, a controller area network (CAN) bus, an Ethernet, or a FlexRay) or a wireless connection.

Each of the components of the camera system 105 may communicate with the electronic controller 110 using various communication protocols. The embodiment illustrated in FIG. 1 provides but one example of the components and connections of the camera system 105. However, these components and connections may be constructed in other ways than those illustrated and described herein.

The camera system 105 can include any number of video cameras or displays which may be located at different positions on the interior or exterior of the vehicle 100. For example, the first video camera 115, or components thereof, may be externally mounted to a portion of the vehicle 100 (such as on a door or a tailgate of a trunk). Alternatively, the first video camera 115, or components thereof, may be internally mounted within the vehicle 100 (for example, positioned by the rearview mirror).

Figure 2:
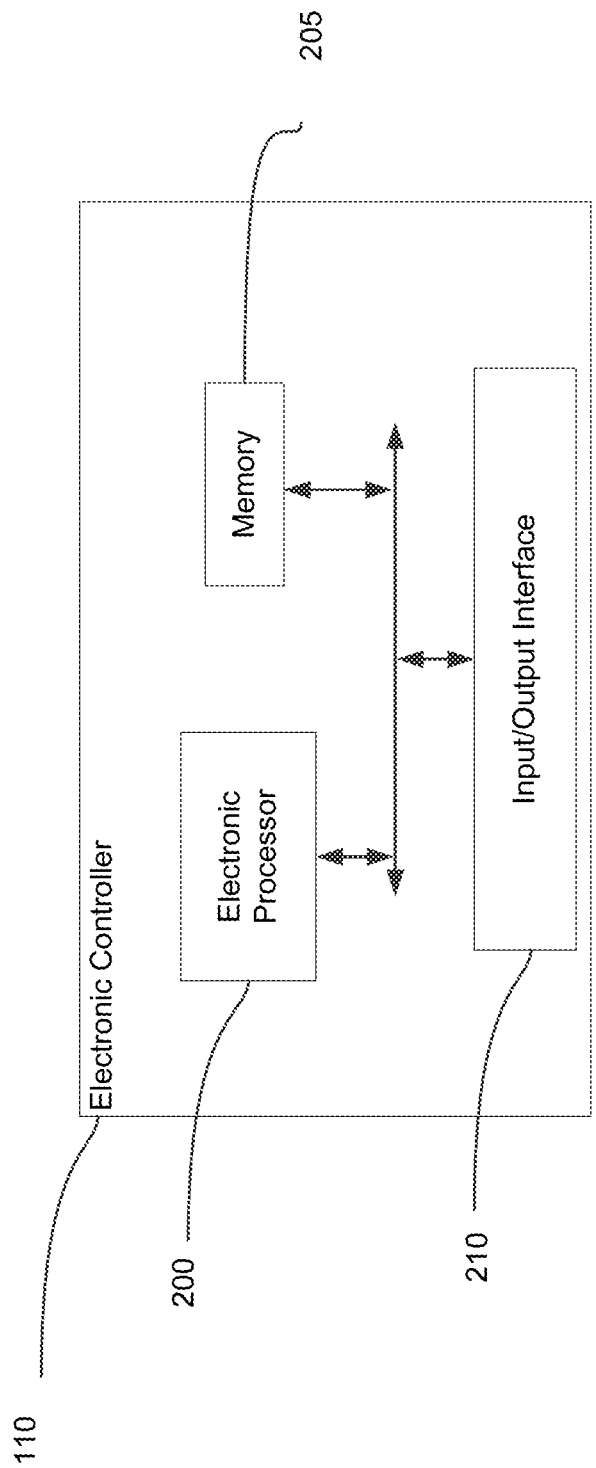
FIG. 2 is a block diagram of an electronic controller of the system of FIG. 1.

FIG. 2 is a block diagram of the electronic controller 110 of the camera system 105 of FIG. 1. The electronic controller 110 includes a plurality of electrical and electronic components that provide power, operation control, and protection to the components and modules within the electronic controller 110. The electronic controller 110 includes, among other things, an electronic processor 200 (such as a programmable electronic microprocessor, microcontroller, or similar device), a memory 205 (for example, non-transitory, machine readable memory), and an input/output interface 210. The electronic processor 200 is communicatively connected to the memory 205 and the input/output interface 210. The first video camera 115, second video camera 120, first display 125, second display 130, orientation adjustment switch 135, selection switch 140, and vehicle communications network 145 communicate with the electronic processor 200 via the input/output interface 210. The electronic processor 200, in coordination with the memory 205 and the input/output interface 210, is configured to implement, among other things, the methods described herein.

The electronic controller 110 may be implemented in several independent controllers (for example, programmable electronic controllers) each configured to perform specific functions or sub-functions. Additionally, the electronic controller 110 may contain sub-modules that include additional electronic processors, memory, or application specific integrated circuits (ASICs) for handling input/output functions, processing of signals, and application of the methods listed below. In other embodiments, the electronic controller 110 includes additional, fewer, or different components.

Figure 3:
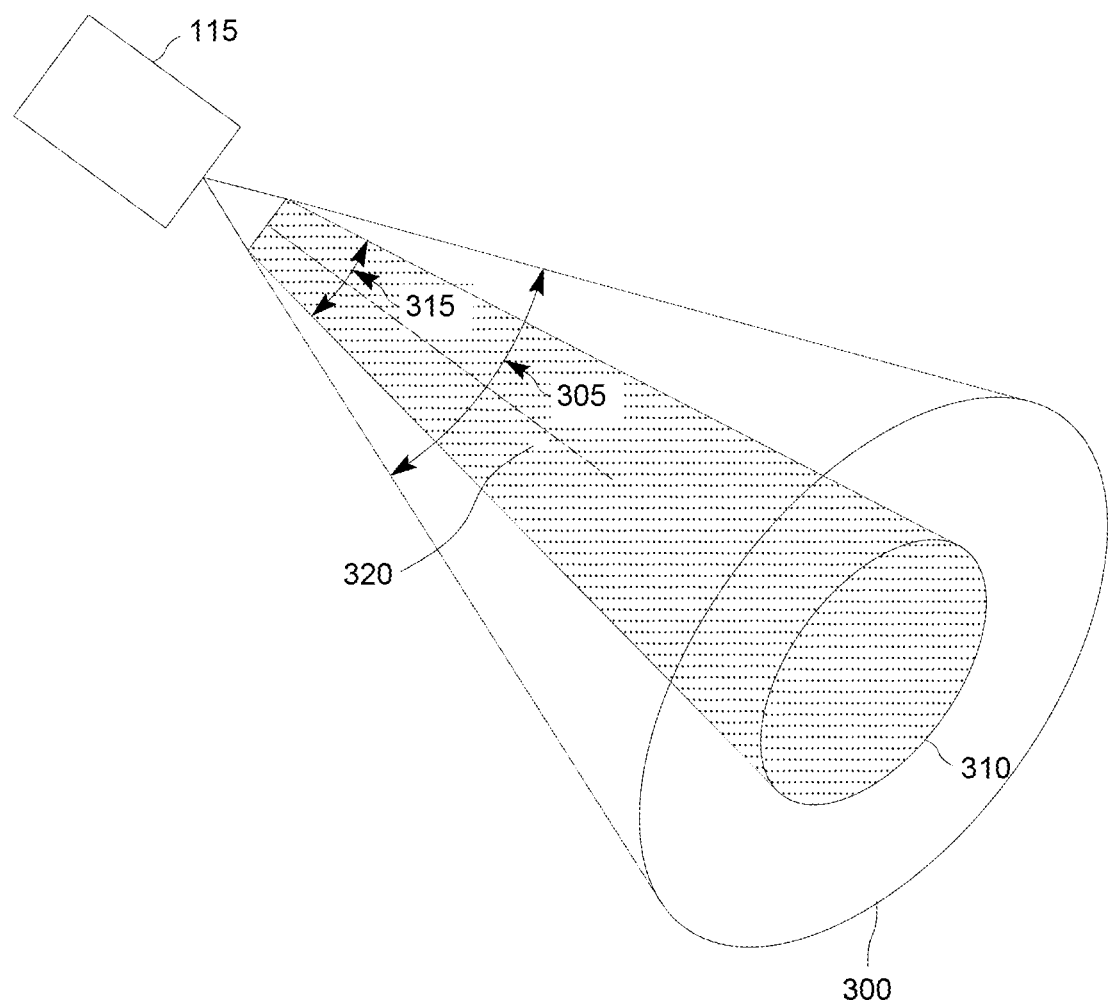
FIG. 3 is a block diagram of a video camera with a first field of vision and a second field of vision.

FIG. 3 illustrates the first video camera 115 of the camera system 105. In the example shown, the first video camera 115 is in a fixed position on the vehicle 100 and has a fixed orientation. Even though the first video camera 115 is in fixed position, it is possible to perform, in a virtual manner, panning and tilting, through processing of captured images or video. The first video camera 115 has a first field of vision 300. The first field of vision 300 is defined by a first solid angle 305. The first field of vision 300 defines the area of the vehicle's surrounding environment that the first video camera 115 is able to capture without changing its position and/or orientation. The first video camera 115 also has a second field of vision 310. The second field of vision 310 is virtual because it is limited by virtual constraints rather than by the physical constraints (the fixed position and orientation) of the first video camera 115. The second field of vision 310 is defined by a second solid angle 315. The first field of vision 300 is larger than the second field of vision 310 and contains the second field of vision 310. For example, the second solid angle 315 of the second field of vision 310 may be 45 degrees and the first solid angle 305 of the first field of vision 300 may be 100 degrees. In the illustrated embodiment, the first field of vision 300 and the second field of vision 310 are circles, however in other embodiments the first field of vision and the second field of vision may be ellipses or one of a plurality of other shapes. Accordingly, the first solid angle 305 and the second solid angle 315 are determined with respect to the same plane. The second field of vision 310 can be moved in two perpendicular directions to any position within the first field of vision 300. For example, the second field of vision 310 can be moved vertically (up and down) and horizontally (left and right). Moving the second field of vision 310 vertically up and down is analogous to tilting a camera and produces a tilted image. Moving the second field of vision 310 horizontally left and right is analogous to panning a camera and produces a panned image. The second field of vision 310 is moved by adjusting an axis 320 of the second solid angle 315 (or an axis 320 of the second field of vision 310), via input from the orientation adjustment switch 135. In some embodiments, a user provides input to the electronic processor 200 via the orientation adjustment switch 135. In other embodiments, an autonomous driving function provides input to the electronic processor 200 via the orientation adjustment switch 135 or independently of the orientation adjustment switch 135. For example, in some embodiments the electronic processor 200 receives a signal to move (tilt) the second field of vision 310 vertically downward when the reverse gear is engaged.

The second video camera 120 is configured in a similar manner to the first video camera 115. The second video camera 120 has a third field of vision which is similar to the first field of vision 300 of the first video camera 115. However, the third field of vision defines an area of the vehicle's surrounding environment that is different from the area of the vehicle's surrounding environment defined by the first field of vision 300. The second video camera 120 has a fourth field of vision which is similar to the second field of vision 310 of the first video camera 115. However, the fourth field of vision is within the third field of vision.

Figure 4:
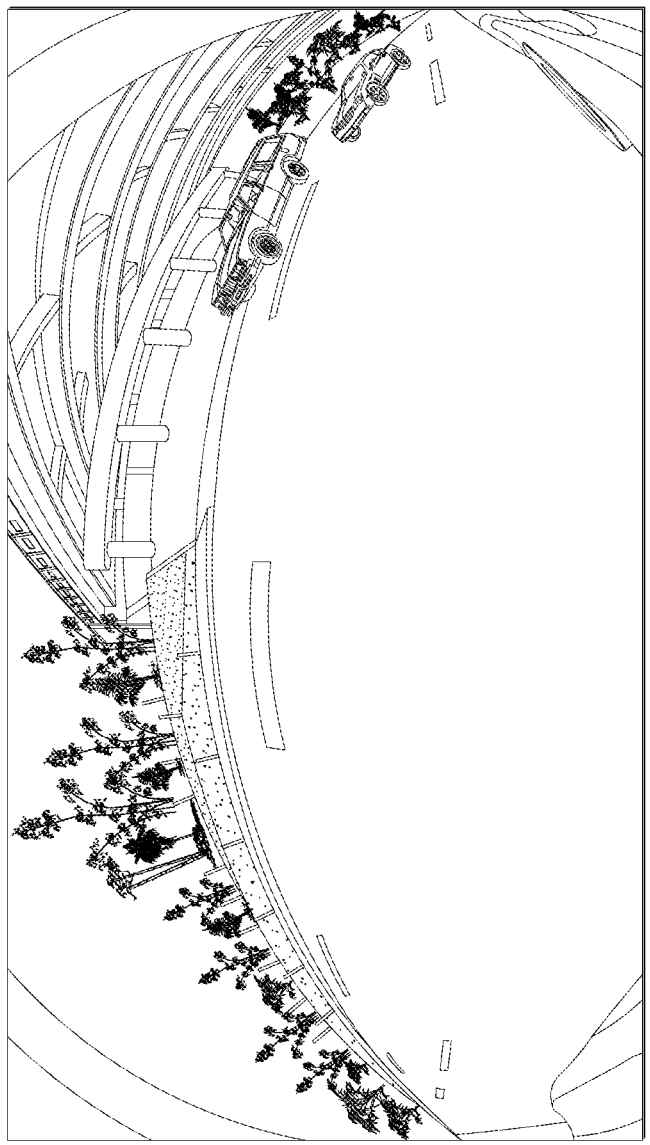
FIG. 4 is an illustration of a non-rectilinear image received from a video camera of the system of FIG. 1.
Figure 4:

FIG. 4 illustrates an example of a non-rectilinear image 400 captured by the first video camera 115. The distortion in the non-rectilinear image 400 is caused by a fisheye lens of the first video camera 115. The fisheye lens causes the first video camera 115 to capture a panoramic non-rectilinear image 400 of the vehicle's surrounding environment. The distortion of the non-rectilinear image 400 causes the image to appear stretched out over a convex hemisphere (or the fisheye lens).

Figure 5:
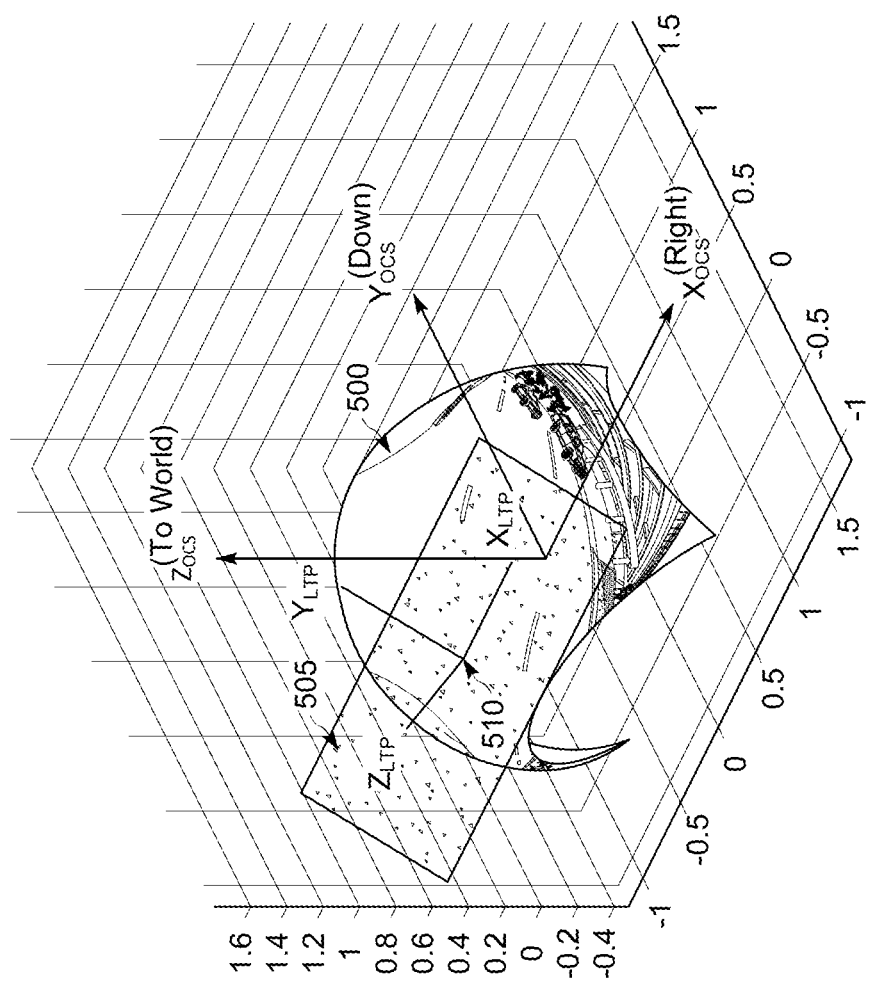
FIG. 5 is an illustration of an application of a distortion correction method to the non-rectilinear image of FIG. 4.

FIG. 5 illustrates the application of a distortion correction method to the non-rectilinear image 400 of FIG. 4. The non-rectilinear image 400 is manipulated in three-dimensional space so that the image forms a partial sphere (a spherical image 500). The spherical image 500 is no longer distorted because the spherical image 500 has the same convex shape as the fisheye lens of the first video camera 115. A rectangular plane 505 is placed in such a way that it lies perpendicular to a point 510 on the surface of the spherical image. The point 510 on the surface of the spherical image 500 is determined based on the second field of vision 310. The spherical image 500 is then projected onto the rectangular plane 505.

Figure 6:
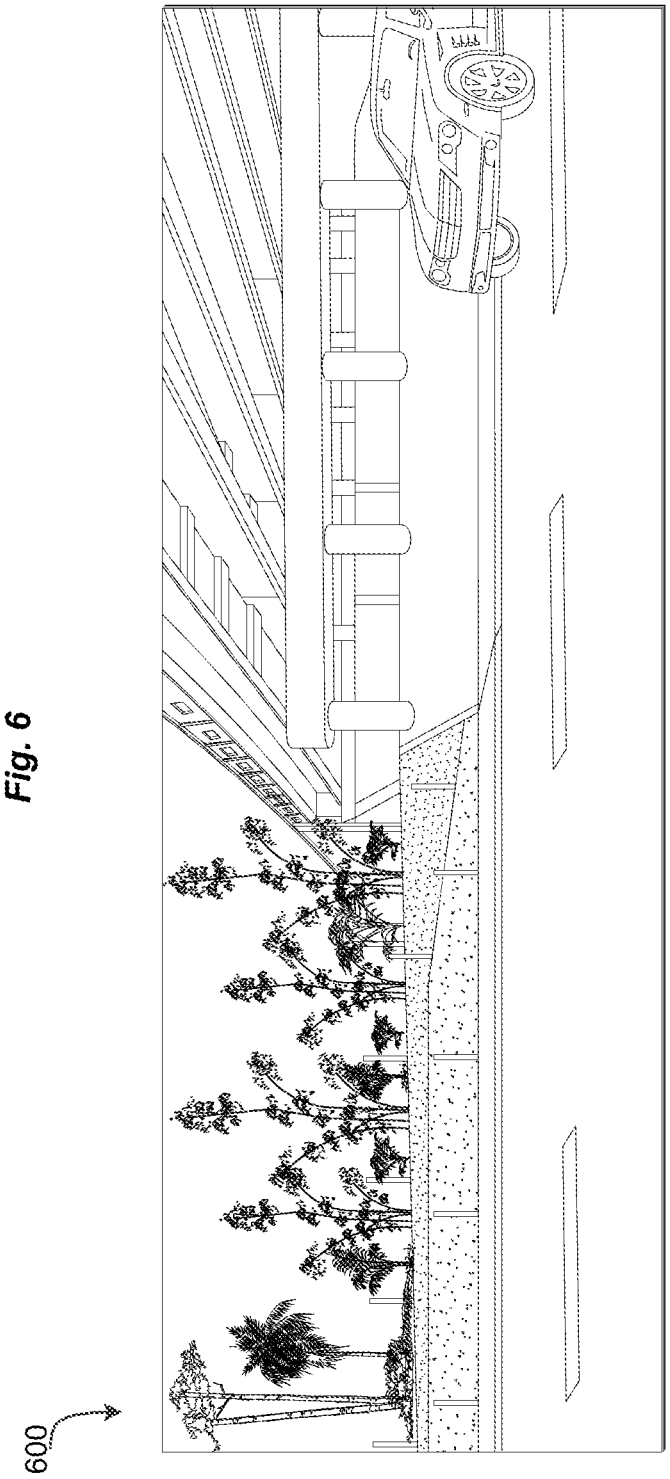
FIG. 6 is an illustration of a rectilinear image resulting from the application of a distortion correction method to the non-rectilinear image of FIG. 4.

FIG. 6. illustrates an undistorted or rectilinear image 600 that results from projecting the spherical image 500 onto the rectangular plane 505.

Figure 7:
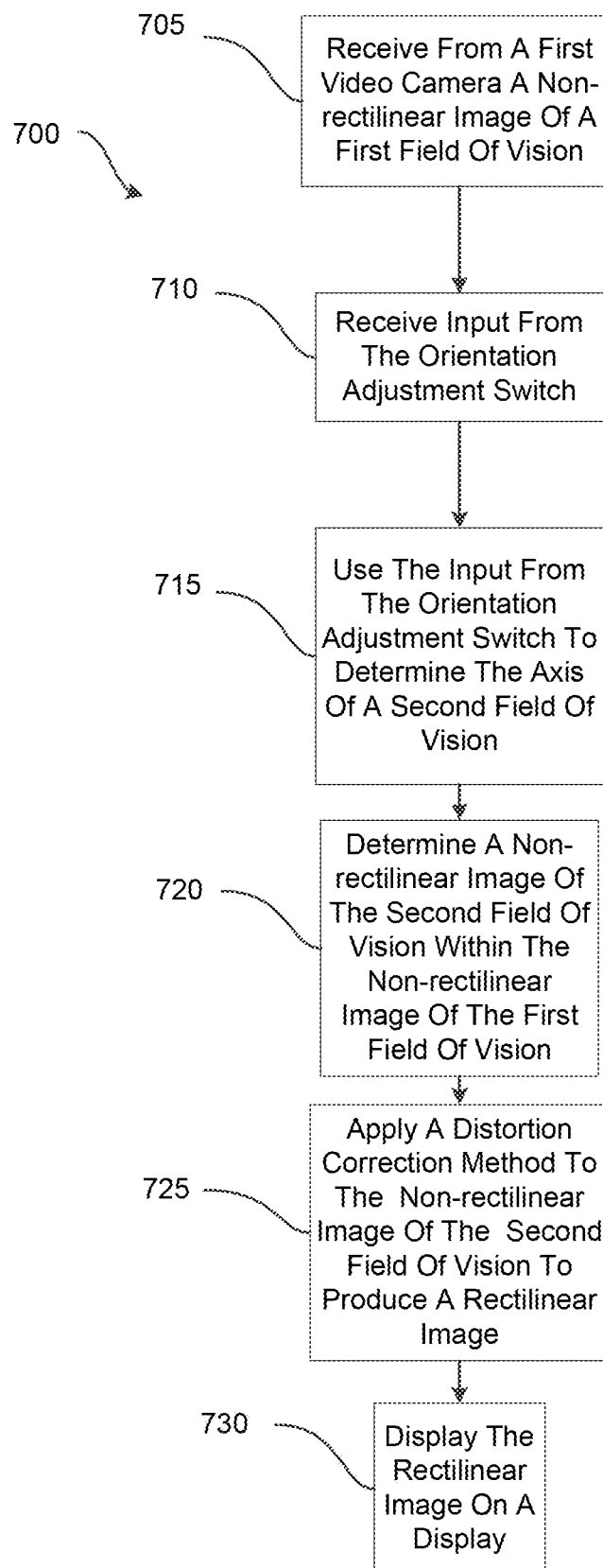
FIG. 7 is a flowchart of a method for displaying a virtual field of vision within a field of vision received from a video camera using the system of FIG. 1.

FIG. 7 illustrates an example method 700 for displaying a virtual field of vision within a field of vision received from a video camera using the camera system 105 of FIG. 1. A non-rectilinear image (for example, the non-rectilinear image 400) of the first field of vision 300 is received by the electronic processor 200 as input from the first video camera 115 (block 705). The electronic processor 200 also receives input from the orientation adjustment switch 135 (block 710). The input from the orientation adjustment switch 135 is used by the electronic processor 200 to determine the axis 320 of the second solid angle 315 of the second field of vision 310 within the first field of vision 300 (block 715). In some embodiments, the electronic processor 200 also receives input indicating the size of the second field of vision 310 within the first field of vision 300. The electronic processor 200 determines the location of the second field of vision 310 within the non-rectilinear image of the first field of vision (block 720). The electronic processor 200 then applies the distortion correction method to the non-rectilinear image of the second field of vision to produce a rectilinear image (for example, the rectilinear image 600) of the second field of vision (block 725). The rectilinear image of the second field of vision is an analog or virtual counterpart of a panned image, a tilted image or both a panned and tilted image. In other words, the rectilinear image is similar to the image that would be captured by a camera that is able to physically pan or tilt. In some embodiments, the distortion correction method may be applied to the non-rectilinear image of the first field of vision before the rectilinear image of the second field of vision is determined within a rectilinear image of the first field of vision. The electronic processor 200 outputs the rectilinear image of the second field of vision to the first display 125. The first display 125 displays the rectilinear image of the second field of vision (block 730).

The method 700 is illustrated as using input from the first video camera 115 to determine the rectilinear image of the second field of vision within the non-rectilinear image of the first field of vision and displaying the rectilinear image of the second field of vision on the first display 125. However, in some embodiments the method 700 may be performed using input from the second video camera 120 to determine a rectilinear image of the fourth field of vision within a non-rectilinear image of the third field of vision and displaying the rectilinear image of the fourth field of vision on the second display 130. Before determining the axis 320 of the second solid angle 315 of the second field of vision 310 or an axis of a fourth solid angle of the fourth field of vision, the electronic processor 200 receives input from the selection switch 140 that determines if the method will be performed using input from the first video camera 115 or the second video camera 120.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A camera system comprising:
a first video camera having a first field of vision;
an orientation adjustment switch;
a second video camera having a third field of vision;
a selection switch;
a first display; and
an electronic processor configured to:
 receive, from the first video camera, a non-rectilinear image of the first field of vision;
 receive, from the selection switch, input determining whether input received from the orientation adjustment switch defines an axis of a second field of vision within the first field of vision or an axis of a fourth field of vision within the third field of vision;
 when the input from the selection switch determines the orientation adjustment switch defines the axis of the second field of vision within the first field of vision, receive, from the orientation adjustment switch, input defining the axis of the second field of vision within the first field of vision;
 apply a distortion correction method to the non-rectilinear image of the first field of vision to produce a rectilinear image of the first field of vision;
 determine a rectilinear image of the second field of vision within the rectilinear image of the first field of vision; and
 display the rectilinear image of the second field of vision on the first display.

2. The camera system according to claim 1, wherein the first video camera is located in a fixed position and has a fixed orientation and wherein the rectilinear image of the second field of vision is a virtual counterpart to a panned image, a tilted image, or both.

3. The camera system according to claim 1, wherein a user or an autonomous driving function defines the axis of the second field of vision via input from the orientation adjustment switch.

4. The camera system according to claim 1, wherein the first video camera has a fisheye lens and the fisheye lens causes a distortion of the non-rectilinear image of the first field of vision.

5. The camera system according to claim 1, wherein the camera system comprises a second display.

6. The camera system according to claim 5, wherein the electronic processor is configured to:
   when the input from the selection switch determines the orientation adjustment switch defines the axis of the fourth field of vision within the third field of vision, receive, from the orientation adjustment switch, input defining the axis of the fourth field of vision within the third field of vision;
   apply the distortion correction method to the non-rectilinear image of the third field of vision to produce a rectilinear image of the third field of vision;
   determine a rectilinear image of the fourth field of vision within the rectilinear image of the third field of vision; and
   display the rectilinear image of the fourth field of vision on the second display.

7. The camera system according to claim 1 wherein, the first field of vision is larger than the second field of vision.

8. The camera system according to claim 1 wherein, the first field of vision covers an area in a vehicle's surrounding environment.

9. The camera system according to claim 1, wherein the electronic processor is further configured to receive as input a size of an area in a vehicle's surrounding environment that the second field of vision covers.

10. A method for displaying a virtual field of vision within a field of vision received from a video camera using a camera system, the method comprising:
    receiving, from a first video camera, a non-rectilinear image of a first field of vision;
    receiving, from a second video camera, a non-rectilinear image of a third field of vision;
    receiving, from a selection switch, input determining whether input received from an orientation adjustment switch defines an axis of a second field of vision within the first field of vision or an axis of a fourth field of vision within the third field of vision;
    when the input from the selection switch determines the orientation adjustment switch defines the axis of the second field of vision within the first field of vision, receiving, from the orientation adjustment switch, input defining the axis of the second field of vision within the first field of vision;
    determining, with an electronic processor, a non-rectilinear image of the second field of vision within the non-rectilinear image of the first field of vision;
    applying, with the electronic processor, a distortion correction method to the non-rectilinear image of the second field of vision to produce a rectilinear image of the second field of vision; and
    displaying, via a first display, the rectilinear image of the second field of vision.

11. The method according to claim 10, wherein the first video camera has a fixed position and a fixed orientation and wherein the non-rectilinear image of the second field of vision is a virtual counterpart to a panned image, a tilted image, or both.

12. The method according to claim 10, wherein receiving input defining an axis of a second field of vision includes receiving a user or an autonomous driving function input from the orientation adjustment switch.

13. The method according to claim 10, wherein, the first video camera has a fisheye lens and the fisheye lens causes a distortion of the non-rectilinear image of the first field of vision.

14. The method according to claim 10, further comprising:
    when the input from the selection switch determines the orientation adjustment switch defines the axis of the fourth field of vision within the third field of vision, receiving, from the orientation adjustment switch, input defining the axis of the fourth field of vision within the third field of vision;
    determining, with the electronic processor, a non-rectilinear image of the fourth field of vision within the non-rectilinear image of the third field of vision;
    applying, with the electronic processor, the distortion correction method to the non-rectilinear image of the fourth field of vision to produce a rectilinear image of the fourth field of vision; and
    displaying, via a second display, the rectilinear image of the fourth field of vision.

15. The method according to claim 10, wherein the first field of vision is larger than the second field of vision.

16. The method according to claim 10, wherein the first field of vision covers an area in a vehicle's surrounding environment.

17. A camera system comprising:
    a first video camera having a first field of vision;
    an orientation adjustment switch;
    a second video camera having a third field of vision;
    a selection switch;
    a first display; and
    an electronic processor configured to:
      receive, from the first video camera, a non-rectilinear image of the first field of vision;
      receive, from the selection switch, input determining whether input received from the orientation adjustment switch defines an axis of a second field of vision within the first field of vision or an axis of a fourth field of vision within the third field of vision;
      when the input from the selection switch determines the orientation adjustment switch defines the axis of the second field of vision within the first field of vision, receive, from the orientation adjustment switch, input defining the axis of the second field of vision within the first field of vision;
      determine a non-rectilinear image of the second field of vision within the non-rectilinear image of the first field of vision;
      apply a distortion correction method to the non-rectilinear image of the second field of vision to produce a rectilinear image of the second field of vision; and
      display the rectilinear image of the second field of vision on the first display.

* * * * *